(12) United States Patent
Nozaki et al.

(10) Patent No.: US 7,481,456 B2
(45) Date of Patent: Jan. 27, 2009

(54) AIRBAG APPARATUS

(75) Inventors: Hiroyuki Nozaki, Utsunomiya (JP); Makoto Nagai, Sakura (JP); Yusuke Chida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/134,655

(22) Filed: Jun. 6, 2008

(65) Prior Publication Data
US 2008/0303257 A1 Dec. 11, 2008

(30) Foreign Application Priority Data
Jun. 11, 2007 (JP) .............................. 2007-154017

(51) Int. Cl.
*B60R 21/16* (2006.01)
(52) U.S. Cl. ..................... 280/743.1; 280/731
(58) Field of Classification Search ................. 280/731, 280/743.1
See application file for complete search history.

(56) References Cited

U.S. PATENT DOCUMENTS

| | | | | |
|---|---|---|---|---|
| 5,470,160 A | * | 11/1995 | Nowlin ........................ 400/105 |
| 5,511,821 A | * | 4/1996 | Meyer et al. .............. 280/743.1 |
| 5,599,040 A | * | 2/1997 | Takahashi et al. ............ 280/729 |
| 5,871,231 A | * | 2/1999 | Richards et al. .............. 280/735 |
| 5,899,495 A | * | 5/1999 | Yamamoto et al. ........ 280/743.1 |
| 6,209,912 B1 | * | 4/2001 | Staub et al. ............... 280/743.1 |
| 6,352,283 B1 | * | 3/2002 | Ellerbrok et al. ......... 280/743.1 |
| 6,634,670 B1 | * | 10/2003 | Ellerbrok et al. ......... 280/743.1 |
| 7,401,811 B2 | * | 7/2008 | Nagai et al. .............. 280/743.1 |
| 2005/0098991 A1 | * | 5/2005 | Nagai et al. .............. 280/743.1 |
| 2007/0241546 A1 | * | 10/2007 | Chida et al. ................. 280/739 |

FOREIGN PATENT DOCUMENTS

JP 2006-224748 8/2006

* cited by examiner

*Primary Examiner*—Toan C To
(74) *Attorney, Agent, or Firm*—Rankin, Hill & Clark LLP

(57) ABSTRACT

An airbag apparatus including: an airbag; a vent hole; a plurality of rupture joining parts which join the base fabric pieces in a manner breakable by the high-pressure gas expansion; and a vent hole cover having a connecting part at which the vent hole cover is connected to the airbag by the rupture joining parts, wherein: the airbag has an outer expansion part provided at a position outside the finishing-ends of the rupture joining parts; the plurality of rupture joining parts are rotationally symmetric to each other about the center of the base fabric pieces, and partially overlap each other in the circumferential direction; and the connecting part of the vent hole cover is provided in the vicinity of a middle position of the two finishing-ends of an adjacent pair of the rupture joining parts.

3 Claims, 11 Drawing Sheets

AIRBAG APPARATUS

BACKGROUND OF THE INVENTION

1. Field of the Invention

Priority is claimed on Japanese Patent Application No. 2007-154017, filed Jun. 11, 2007, the contents of which are incorporated herein by reference in their entirety.

The present invention relates to an airbag apparatus which is provided at, e.g., a steering wheel of a vehicle, and develops an airbag when an impact is applied to the vehicle, in order to protect a passenger.

2. Description of the Related Art

There are disclosures of airbag apparatuses which develop an airbag using high-pressure gas provided from are inflator, at a time of a vehicle impact or the like. Some of such airbag apparatuses are provided with a vent hole, which is released in the process of the development of the airbag.

Some airbag apparatuses have an airbag provided with rupture joining parts which rupture in the process of the airbag development, in order to control the airbag development behavior and the internal air pressure thereof. At the time of the inflating operation, the rupture joining parts are ruptured part by part, thereby gradually increasing the volume of the airbag (e.g., see Japanese Unexamined Patent Application, First Publication No. 2006-224748).

In the airbag apparatus disclosed in the Japanese Unexamined Patent Application, First Publication No. 2006-224748, a plurality of the rupture joining parts are provided at the peripheral part of the airbag. The plurality of the rupture joining parts are rotationally symmetric to each other. A part of one rupture joining part overlaps with another rupture joining part in the circumferential direction. A strip-shaped vent hole cover which covers the vent hole is secured to the airbag, by a part of the rupture joining part. In this airbag apparatus, a gas inlet connected to the inflator is provided at the center part of the airbag. When the inflator is operated, the airbag develops, starting from the center part thereof, expanding in radially outward directions. During this, the rupture joining parts are ruptured starting from a starting-end thereof provided at a center part of the airbag, to the finishing-end thereof provided at an outer part of the airbag, continuously. The vent hole cover is secured at a position corresponding to the middle part between the starting-end and the finishing-end of the rupture joining part. During the outward expansion in the development of the airbag, the attachment of the vent hole cover to the airbag is released, and the vent hole is released open.

Therefore in this airbag apparatus, during the inflating operation, since the rupture joining part is ruptured gradually, the airbag development behavior and the internal air pressure can be controlled appropriately. During the rupture of the rupture joining part, by releasing the attachment of the vent hole cover, the increase of the internal gas pressure can be regulated at an appropriate timing.

As shown above, in the conventional airbag apparatus, during the inflating operation, the rupture joining part is ruptured from the center part of the airbag to the outer part of the airbag. During this, the attachment of the vent hole cover is released. If the rupture process of the rupture joining part is stopped before it reaches the part where the vent hole cover is attached for any reason, there is a problem in that the vent hole can not be released at the predetermined appropriate timing.

In view of the above problem, the object of the present invention is to provide an airbag apparatus which can release the vent hole at a predetermined timing even when the rupture of the rupture joining part is interrupted for any reason, and thereby can stably control the development behavior and the internal air pressure of the airbag.

SUMMARY OF THE INVENTION

The present invention employed the following to achieve the above object.

(1) An airbag apparatus including: an airbag having at least a pair of base fabric pieces, at least one of which having, a center part from which high-pressure gas is introduced into an internal space enclosed by the pair of base fabric pieces, thereby expanding the airbag; a vent hole which discharges internal gas of the airbag; a plurality of rupture joining parts each having, a starting-end and a finishing-end, the finishing-end provided at an outer position of the airbag than the starting-end, the plurality of rupture joining parts joining the base fabric pieces in a manner breakable by the high-pressure gas expansion; and a vent hole cover having a connecting part at which the vent hole cover is connected to the airbag by the rupture joining parts, wherein: the airbag has an outer expansion part provided at a position outside the finishing-ends of the rupture joining parts; the plurality of rupture joining parts are rotationally symmetric to each other about the center of the base fabric pieces, and partially overlap each other in the circumferential direction; and the connecting part of the vent hole cover is provided in the vicinity of a middle position of the two finishing-ends of an adjacent pair of the rupture joining parts.

According to the airbag apparatus, when the high-pressure gas is introduced from the center part of the airbag, the rupture joining part gradually ruptures from the starting-end toward the finishing-end. By this means, the expansion part of the airbag gradually expands from the center part toward the outer part. Thereafter, during the rupture of the rupture joining part from the starting-end to the finishing-end, the connection of the vent hole cover is released, thereby releasing open the vent hole, and discharging the internal gas of the airbag.

When the rupture of one of the rupture joining parts (first rupture joining part) is interrupted somewhere in between the starting-end and the finishing-end, even if the interruption occurred before the rupture reaches the connecting part of the vent hole cover, the rupture of the adjacent rupture joining part (second rupture joining part) can continue toward the finishing-end. After such a continuing rupture of the second rupture joining part for a certain length, a sudden surge of the high-pressure gas introduction occurs into the outer expansion part of the airbag. Thereafter, the first rupture joining part, in which the interruption of the rupture occurred, begins to rupture from the other end, that is, the finishing-end, in the opposite direction, i.e., toward the connecting part of the vent hole cover.

On this occasion, the length by which the rupture of the second rupture joining part proceeds, from the time point of the interruption, to the point where the surge of the high-pressure gas into the outer expansion part occurs, is denoted length L1. The length by which the rupture of the first rupture joining part proceeds in the opposite direction, from the finishing-end to the connecting part of the vent hole cover, is denoted length L2. According to the constitution of the airbag apparatus, the length of the first rupture joining part from the point of the interruption to the connecting part, length L3, is equal to L1 plus L2. This effect is obtained because the connecting part of the vent hole cover is provided in the vicinity of a middle position of the two finishing-ends of an adjacent pair of the rupture joining parts. Therefore, even when the rupture interruption occurs, the vent hole cover is released open at the same timing as the intended release timing when the interruption does not occur.

According to the airbag apparatus, the airbag has an outer expansion part provided at a position outside the finishing-ends of the rupture joining parts. Moreover, the connecting part of the vent hole cover is provided in the vicinity of a middle position of the two finishing-ends of an adjacent pair of the rupture joining parts. Accordingly, even when the rupture interruption occurs, the rupture joining part is ruptured from the finishing-end, and the vent hole cover is stably released open at the same timing as the intended release timing when the interruption does not occur. As a result, there is an advantageous effect of a secure and stable control of the airbag expansion and the internal air pressure.

(2) In the airbag apparatus, the plurality of the rupture joining parts may include a first rupture joining part and a second rupture joining part; and the starting-end of the first rupture joining part may be provided in a vicinity of the finishing-end of the second rupture joining part, in a circumferential direction of the airbag.

In this case, since the starting-end of the first rupture joining part is provided in a vicinity of the finishing-end of the second rupture joining part, in a circumferential direction of the airbag, there is an advantageous effect in that the relative locations of the rupture joining parts are readily adjusted.

(3) In the airbag apparatus, the pair of the base fabric pieces may be joined to each other at a peripheral joining part provided at a periphery part of the base fabric pieces; the periphery part of the base fabric pieces may protrude into the internal space enclosed by the pair of the base fabric pieces; the finishing-ends of the plurality of the rupture joining parts may be provided separated in the radial direction of the base fabric pieces from the peripheral joining part; and the outer expansion part may be provided between the peripheral joining part and the rupture joining part.

In this case, there is an advantageous effect of a simple and easy production process. At the same time, even when the rupture process from the starting-end is interrupted, it is possible to securely and stably rupture the rupture joining part from the finishing-end.

DETAILED DESCRIPTION OF THE INVENTION

Hereinafter, an embodiment of the present invention is explained with reference to FIGS. 1 to 13. The airbag apparatus of each of the embodiments shows an aspect of an airbag which is stored in a steering wheel for a driver of a vehicle.

Figure 1:
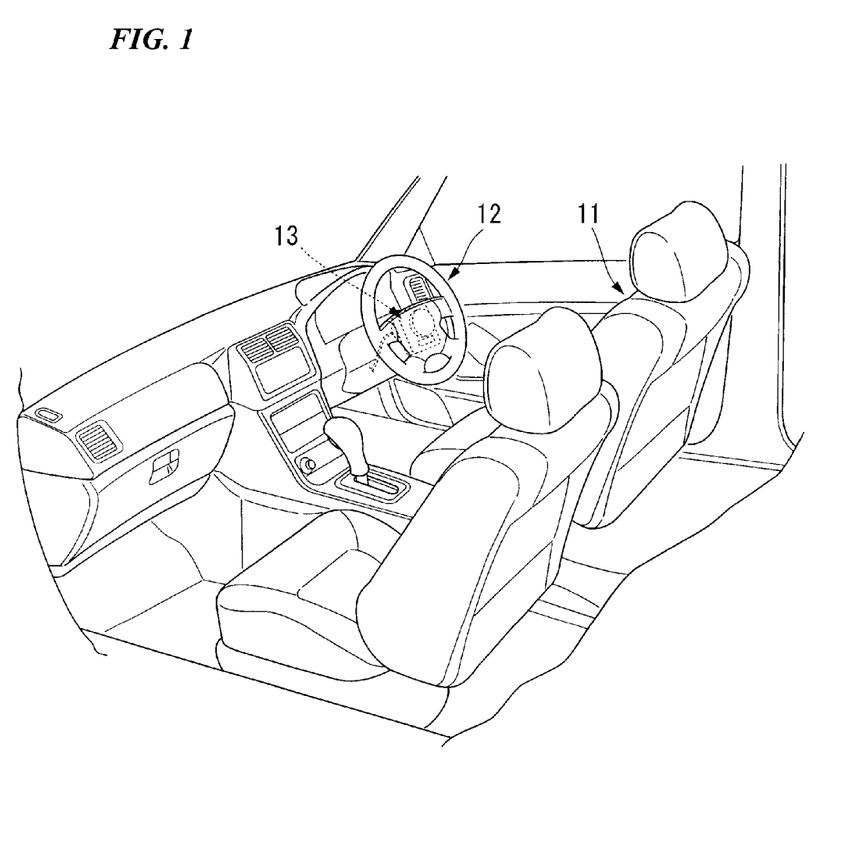
FIG. 1 is a perspective view of an interior of a vehicle provided with an airbag apparatus according to one embodiment of the present invention.

As shown in FIG. 1, an airbag apparatus 13 according to the present invention is stored in a steering wheel 12 provided in front of a driver's seat 11. The airbag apparatus 13 is provided with: an inflator 31 which generates high-pressure gas at the time of an impact input to the vehicle; and an airbag 32 which expands and develops by a supply of the high-pressure gas from the inflator 31 (see FIG. 2). In a regular state of the vehicle, the airbag apparatus 13 is folded and stored inside a cover provided at a center part of the steering wheel 12.

Figure 2:
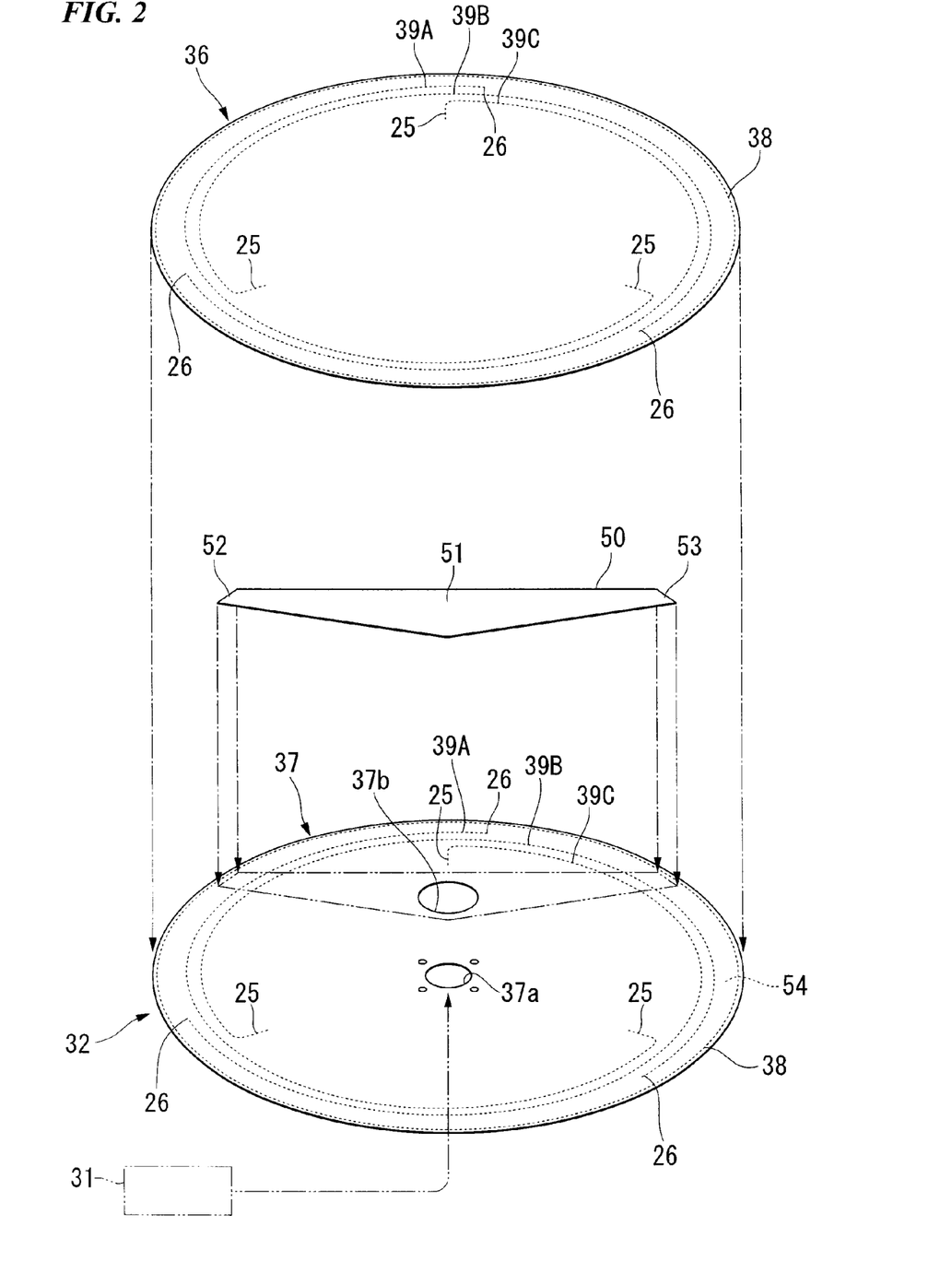
FIG. 2 is an exploded perspective view of the airbag apparatus.

As shown in FIG. 2, the circular airbag 32 is provided with a first base fabric piece 36 at a rear side (facing the driver), and a second base fabric piece 37 stacked on a front face of the first base fabric piece 36. The first base fabric piece 36 and the second base fabric piece 37 are sewn together at a peripheral joining part 38 which is provided at a peripheral part of the first base fabric piece 36 and the second base fabric piece 37. The first base fabric piece 36 and the second base fabric piece 37 are further sewn at a radially inside position of the peripheral joining part 38, by a plurality of spiral shaped rupture joining parts 39A, 39B, and 39C. In this embodiment, three rupture joining parts 39A, 39B, and 39C are used. However, four rupture joining parts may be used. The peripheral joining part 38 is sewn using thicker threads so as not to rupture during the expansion of the airbag 32. The internal three rupture joining parts 39A, 39B, and 39C are weakly sewn using thinner threads so as to easily rupture during the expansion of the airbag 32. The rupture joining parts 39A, 39B, and 39C will be further described in detail later.

The second base fabric piece 37 is provided with: a circular inflator opening 37a which is connected to the inflator 31; and a circular vent hole 37b which ejects a part of the internal gas during the expansion of the airbag 32. The inflator opening 37a is provided at a center position of the second base fabric piece 37. The vent hole 37b is provided at a position apart from the center of the second base fabric piece 37. The inflator 31 generates high-pressure gas and supplies it into the airbag 32 through the inflator opening 37a at the center of the second base fabric piece 37.

Figure 3:
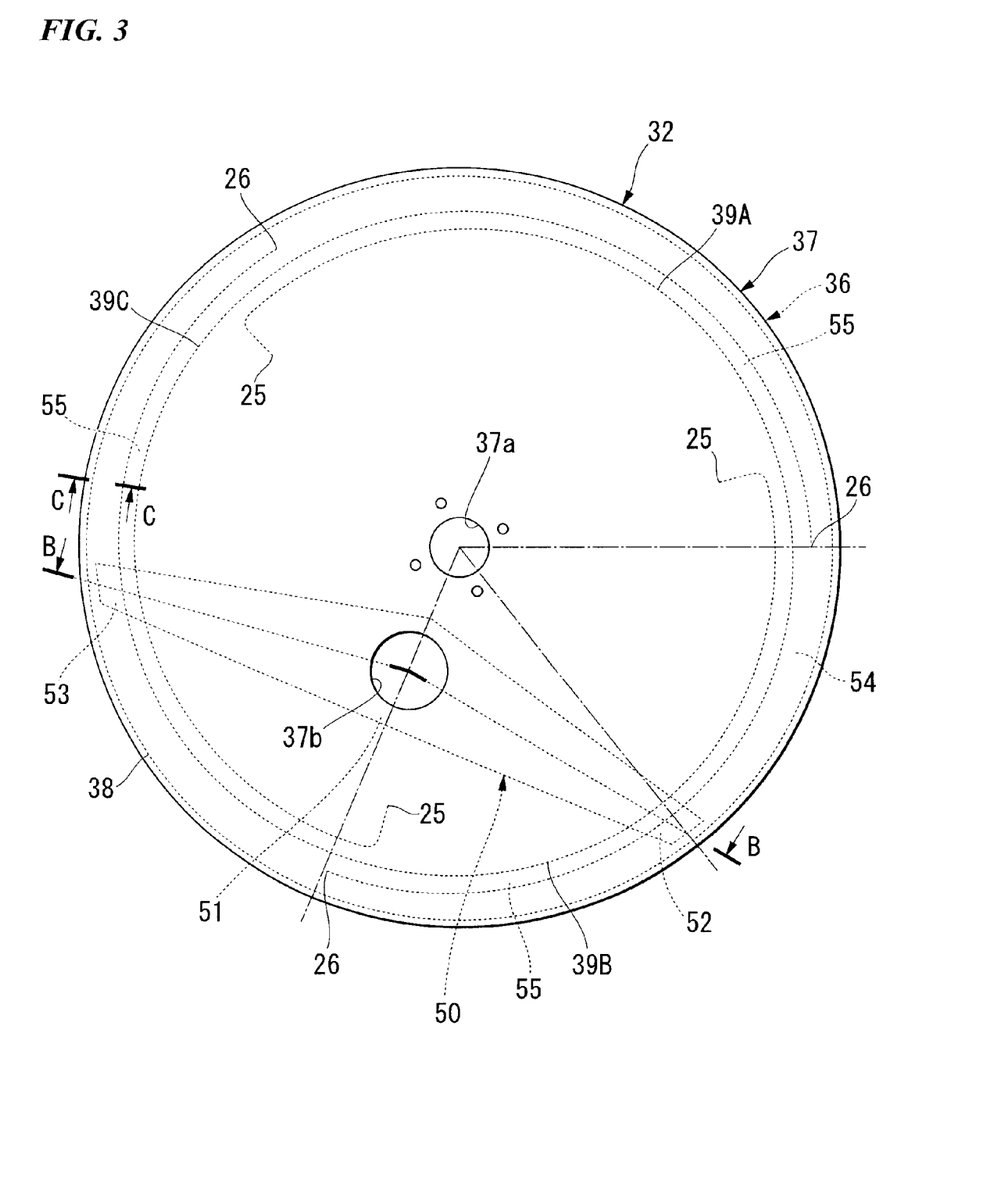
FIG. 3 is a rear view of an airbag in the airbag apparatus.

At the inside of the airbag 32, a vent hole cover 50 is provided, which controls the internal gas pressure during the expansion. As shown in FIG. 2 and FIG. 3, the vent hole cover 50 is a belt-shaped sheet. The center part of the vent hole cover 50 in the longitudinal direction of the belt shape is the widest, with the width gradually decreasing toward both ends. The center part in the longitudinal direction of the vent hole cover 50 is a closing part 51 by which the vent hole 37b is covered up. Both ends in the longitudinal direction of the vent hole cover 50 are connecting parts 52, 53, which are sewn with the first and second base fabric pieces 36, 37 by the rupture joining parts 39A, 39B. While the vent hole cover 50 is sewn at the connecting parts 52, 53 with the airbag 32, the vent hole 37b is substantially closed by the closing part 51. The vent hole cover 50 releases the vent hole 37b wide open, when the connections at the connecting parts 52, 53 are ruptured.

Each of the rupture joining parts 39A, 39B, and 39C, which sews the first base fabric piece 36 and the second base fabric piece 37, as shown in FIG. 3, is curved and provided in a spiral shape starting it a starting-end 25, provided at a radially inside position of both base fabric pieces 36, 37, to a finishing-end 26, provided at a radially outside position. The rupture joining parts 39A, 39B, and 39C are provided rotationally symmetric to each other about the center of both base fabric pieces 36, 37. The adjacent pairs of the rupture joining parts 39A, 39B, and 39C are provided partially overlapping each other in the circumferential direction. Specifically, each of the three rupture joining parts 39A, 39B, and 39C is constituted as a spiral spanning substantially two thirds of the circumference. The three rupture joining parts 39A, 39B, and 39C are formed in the same size and the same shape with one another. The three rupture joining parts 39A, 39B, and 39C are provided along a circumference having the same center as the base fabric pieces 36, 37, and distributed evenly with one another along the circumferential direction. Each of the adjacent pairs of the three rupture joining parts 39A, 39B, and 39C overlap with each other along an angle range of slightly larger than one third of a round. Accordingly, for the most part along the circumference of the base fabric pieces 36, 37, the curved portions of the three rupture joining parts 39A, 39B, and 39C are provided overlapping two-fold, one being inside and the other being outside. In the angle ranges in the vicinity of the starting-ends 25 and the finishing-ends 26 of the rupture joining parts 39A, 39B, and 39C, the curved portions are provided three-fold.

The starting-end 25 of each of the rupture joining parts 39A, 39B, and 39C protrudes toward the radially inside direction, pointing the center part of the airbag 32. Accordingly, during the development of the airbag 32, the stress force is concentrated at the starting-end 25, thereby facilitating the rupture initiation of the rupture joining part 39.

The finishing-end 26 of each of the rupture joining parts 39A, 39B, and 39C, is provided at a position apart from the peripheral joining part 38 of the airbag 32 in the radially inside direction. In the periphery part of the airbag 32, a ring area 54 is provided between the rupture joining parts 39A, 39B, and 39C and the peripheral joining part 38. The ring area 54 is an outer expansion part which drastically expands in volume in the thickness direction, when the high-pressure gas is introduced therein. Thereinafter, the ring area 54 is referred to as the outer expansion part 54.

The outer expansion part 54 expands its volume in the thickness direction when the high-pressure gas is introduced thereto. The inflator opening 37a from where the high-pressure gas is introduced, and the outer expansion part 54 are connected via narrow paths 55 (as shown in FIG. 3), each of which is surrounded by an adjacent pair of the rupture joining parts 39A, 39B, and 39C. Accordingly, until the rupture of the rupture joining parts 39A, 39B, and 39C proceeds to a point where the paths 55 become widely open, the high-pressure gas is not introduced at a substantial rate.

Figure 6:
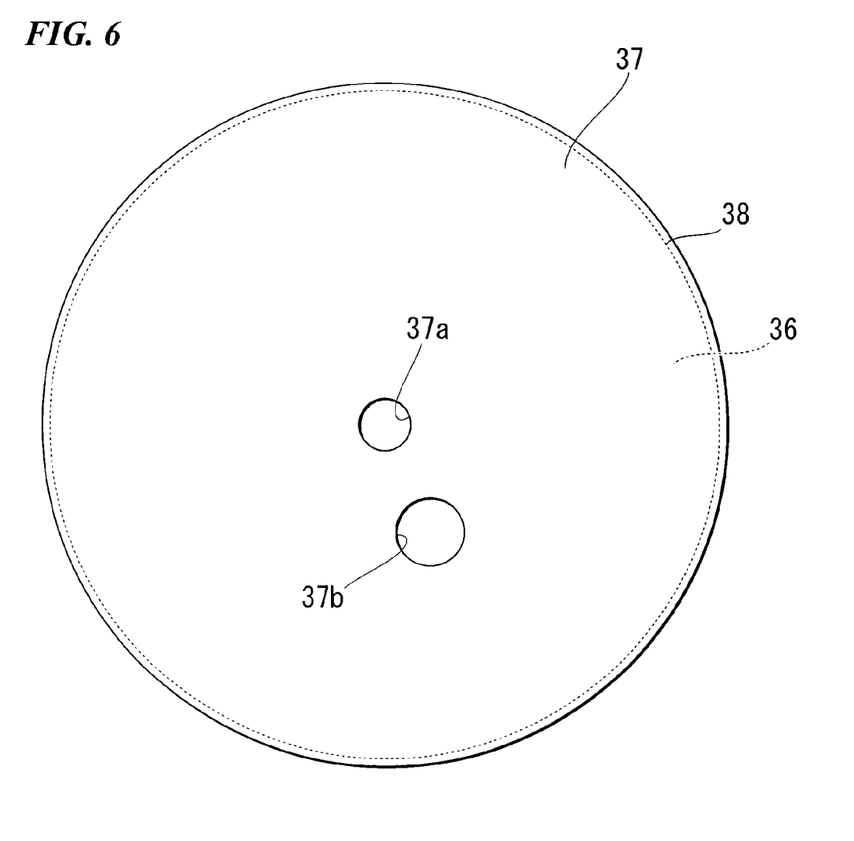
FIG. 6 is a rear view showing a production step of the airbag in the airbag apparatus.
Figure 7:
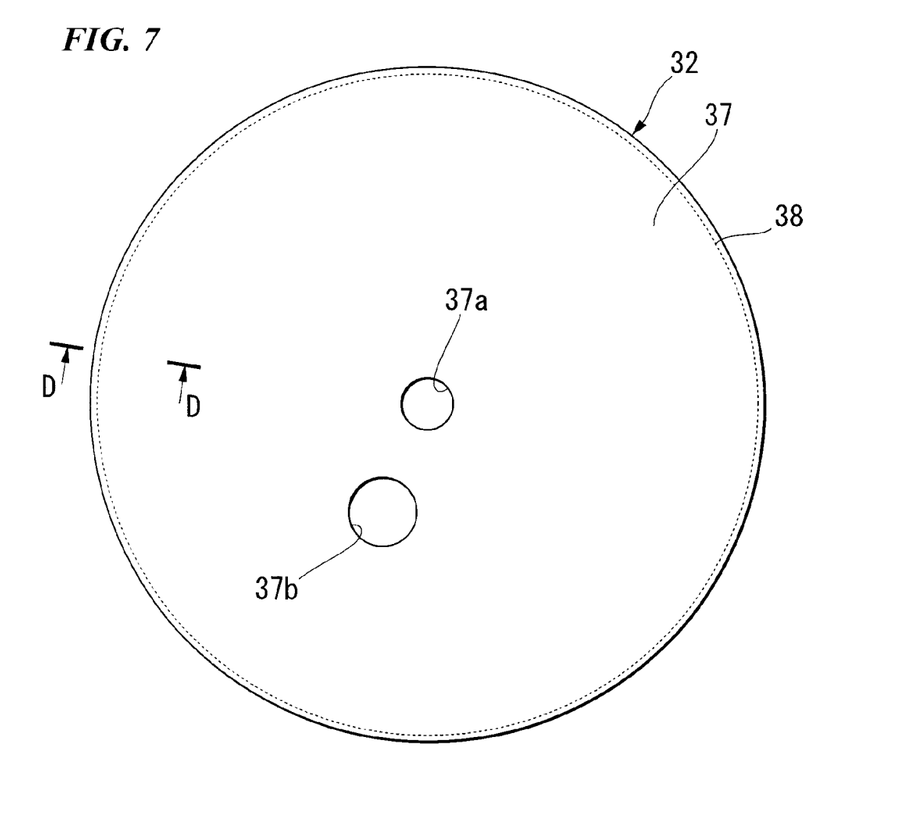
FIG. 7 is a rear view showing a production step of the airbag in the airbag apparatus.
Figure 8:
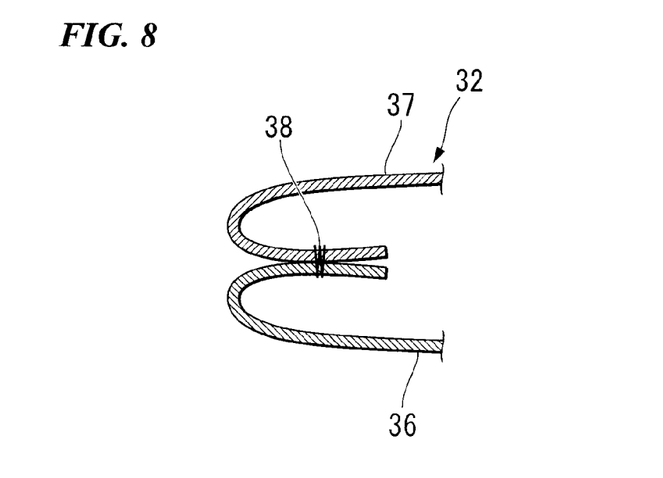
FIG. 8 is a sectional view along the line D-D in the FIG. 7.

The airbag 32 includes, as described above, the first base fabric piece 36 and the second base fabric piece 37. Specifically, as shown in FIG. 6, the first base fabric piece 36 is laid on top of the second base fabric piece 37, and the periphery parts thereof are sewn together, thereby forming the peripheral joining part 38. Thereafter, as shown in FIG. 7 and FIG. 8, the base fabric pieces 36, 37 are flipped inside-out. Thereafter, at a central position of the thus formed airbag 32, the vent hole cover 50 is placed, and sewn together at three spiral shaped portions. Thereby, the rupture joining parts 39A, 39B, and 39C are formed. At the same time, the connecting parts 52, 53 at both ends of the vent hole cover 50, are sewn with the base fabric pieces 36, 37. At this time, the finishing-ends 26 of the rupture joining parts 39A, 39B, and 39C are formed at positions radially inside the peripheral joining part 38. Accordingly, as shown in FIGS. 3 and 5, the ring shaped outer expansion part 54 is formed in the airbag 32.

Figure 4:
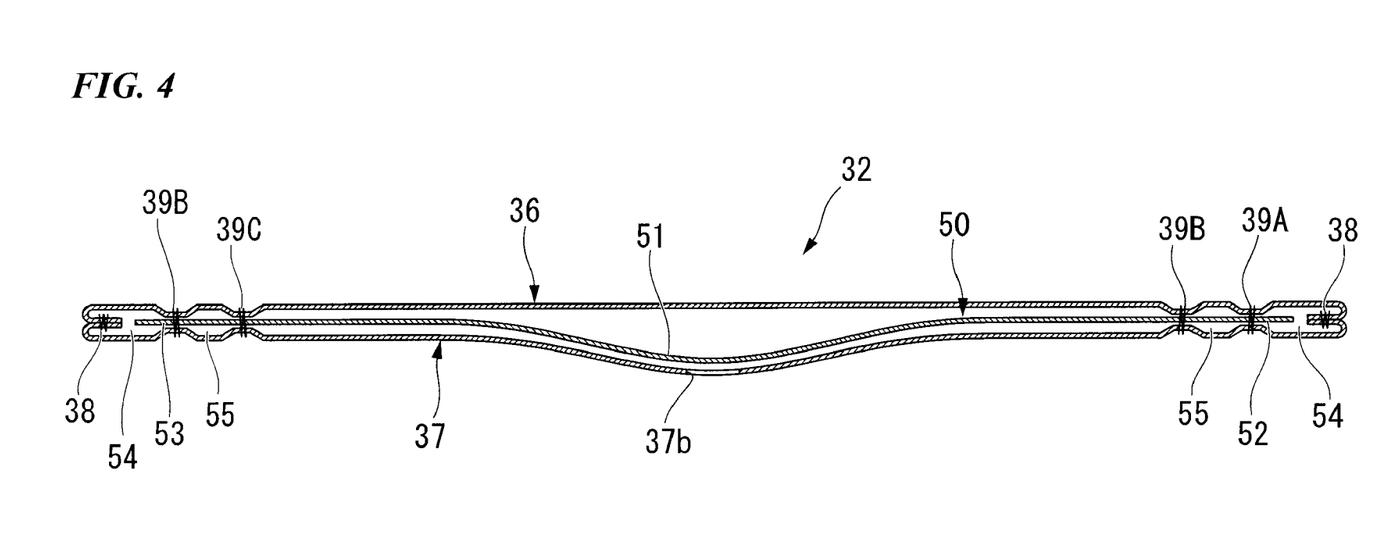
FIG. 4 is a sectional view along the line B-B in the FIG. 3.
Figure 5:
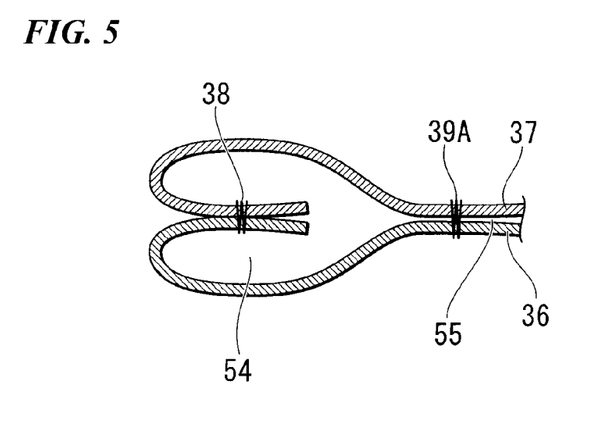
FIG. 5 is a sectional view along the line C-C in the FIG. 3.

As shown in FIGS. 4 and 5, in this embodiment, the peripheral parts of the first base fabric piece 36 and the second base fabric piece 37 are folded, at the outer expansion part 54, pointing in an inside direction. The folded part is sewn at the peripheral joining part 38. Accordingly, the peripheral parts of the first base fabric piece 36 and the second base fabric piece 37 are further expandable in the thickness direction as compared to the expansion at the central part of the airbag 32. Accordingly, as described earlier, when the high-pressure gas is introduced into the airbag 32 from the inflator opening 37a, and the rupture of the rupture joining parts 39A, 39B, and 39C proceeds, thereby widely opening the path 55, the expansion of the airbag 32 at the outer expansion part 54 is initiated.

The connecting parts 52, 53 at both ends of the vent hole cover 50, as previously described, are sewn with the first and second base fabric pieces 36, 37 by the rupture joining parts 39A, 39B. As shown in FIG. 3, each of the connecting parts 52, 53 is provided at a position in the vicinity of the middle part of the finishing-ends 26 of the pair of rupture joining parts 39C, 39A, and the pair of rupture joining parts 39A, 39B, respectively.

In the airbag apparatus 13 of the above constitution, when an application of an acceleration greater than a predetermined value, or the like, is detected, the inflator 31 is activated. The folded airbag 32 begins to develop by the effect of the high-pressure gas which is generated in the inflator 31. When the airbag 32 develops accordingly, as a result of the expansion pressure of the airbag 32, the front cover of the steering wheel 12 ruptures. Through the opening thereby formed, the airbag 32 further develops toward the vehicle interior direction.

The first and second base fabric pieces 36, 37, which form the airbag 32, are sewn together by three spiral rupture joining parts 39A, 39B, and 39C. Therefore, the airbag 32 development does not proceed immediately to a completion. The center part of the airbag 32 develops first. Thereafter, following the progress of the rupture of the rupture joining parts 39A, 39B, and 39C from the starting-end 25 to the finishing-end 26, the expansion part spreads out gradually. Thereby, the airbag 32 increases the volume thereof, following a predetermined expansion behavior, to finally develop into a shape which is flattened in the front-rear direction, and exhibits the largest restriction force onto the passenger.

Figure 9:
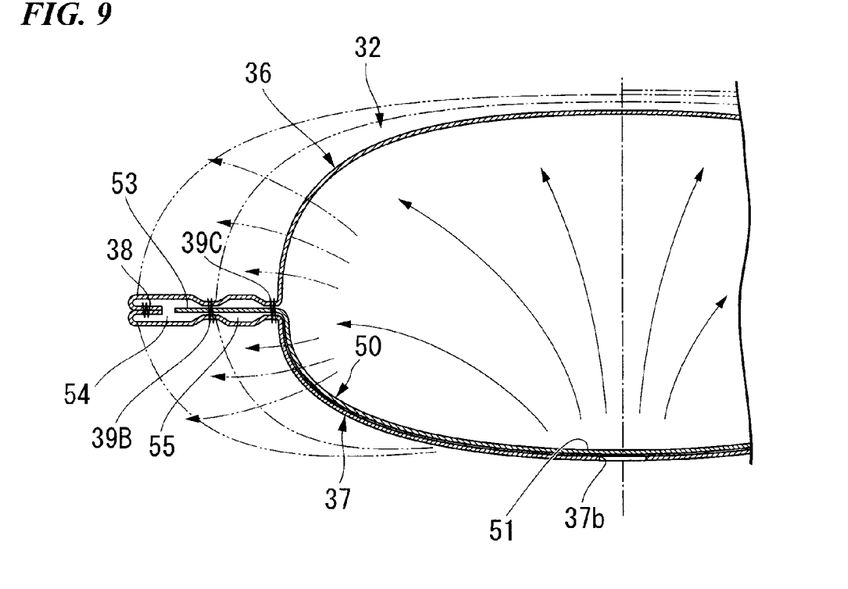
FIG. 9 is a sectional view of the airbag apparatus in an initial stage of an expansion.

In the early phase of the airbag 32 development, the connecting parts 52, 53 of the vent hole cover 50 are sewn to the first and second base fabric pieces 36, 37 by the rupture joining parts 39A, 39B, and 39C. Accordingly, as shown in FIG. 9, the vent hole 37b is closed by the closing part 51 of the vent hole cover 50. Thereby, gas leakage from the airbag 32 is prevented. Accordingly, at this time, the internal air pressure of the airbag 32 rises rapidly, and the development of the airbag 32 is performed rapidly.

Figure 10:
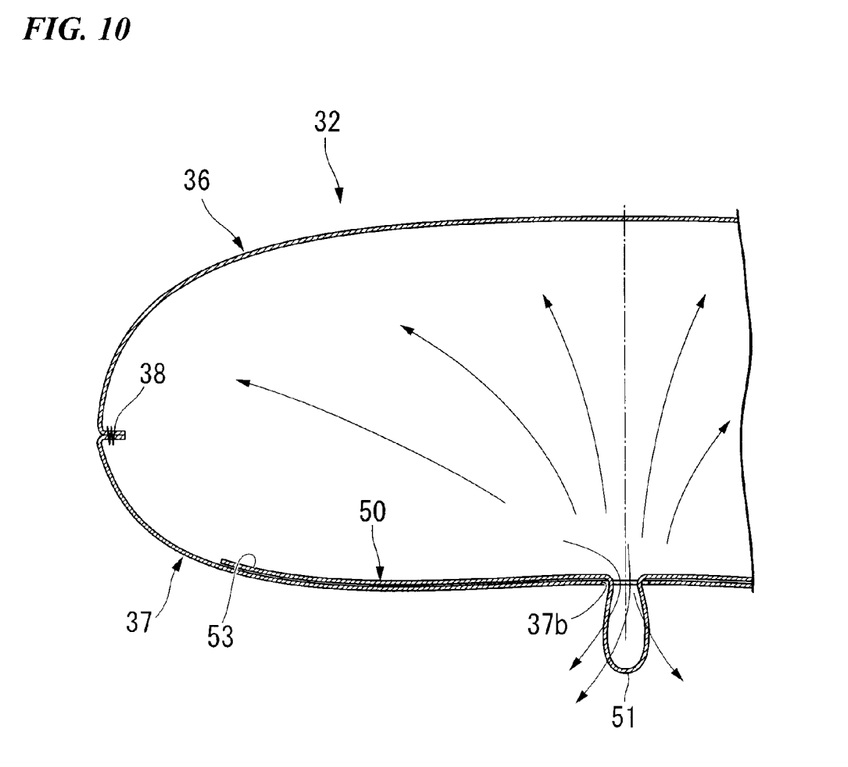
FIG. 10 is a sectional view of the airbag apparatus in a late stage of the expansion.

As the airbag 32 develops the rupture positions of the rupture joining parts 39A, 39B, and 39C reach a predetermined point close to the finishing-end 26. At this time, by a further rupture of the rupture joining parts 39A, 39B, the grip of the connecting parts 52, 53 of the vent hole cover 50 is released. As a result, as shown in FIG. 10, the closing part 51 of the vent hole cover 50 is pushed out of the vent hole 37b. Thereby, the blocking of the vent hole 37b by the vent hole cover 50 is released. Accordingly, excess gas in the airbag 32 is discharged through the vent hole 37b, and an excessive increase of the internal air pressure in the airbag 32 is prevented. Thereafter, as a result of the gas pressure discharge from the vent hole 37b and the further rupture progress of the rupture joining parts 39A, 39B, and 39C, the development behavior of the airbag 32 is controlled as desired.

At the time of the airbag 32 development, if the rupture of the rupture joining parts 39A, 39B, which begins from the side of the starting-end 25, is interrupted for some reason, before the rupture reaches the connecting parts 52, 53 of the vent hole cover 50, the release of the vent hole cover 50 is performed in the following manner.

Figure 11:
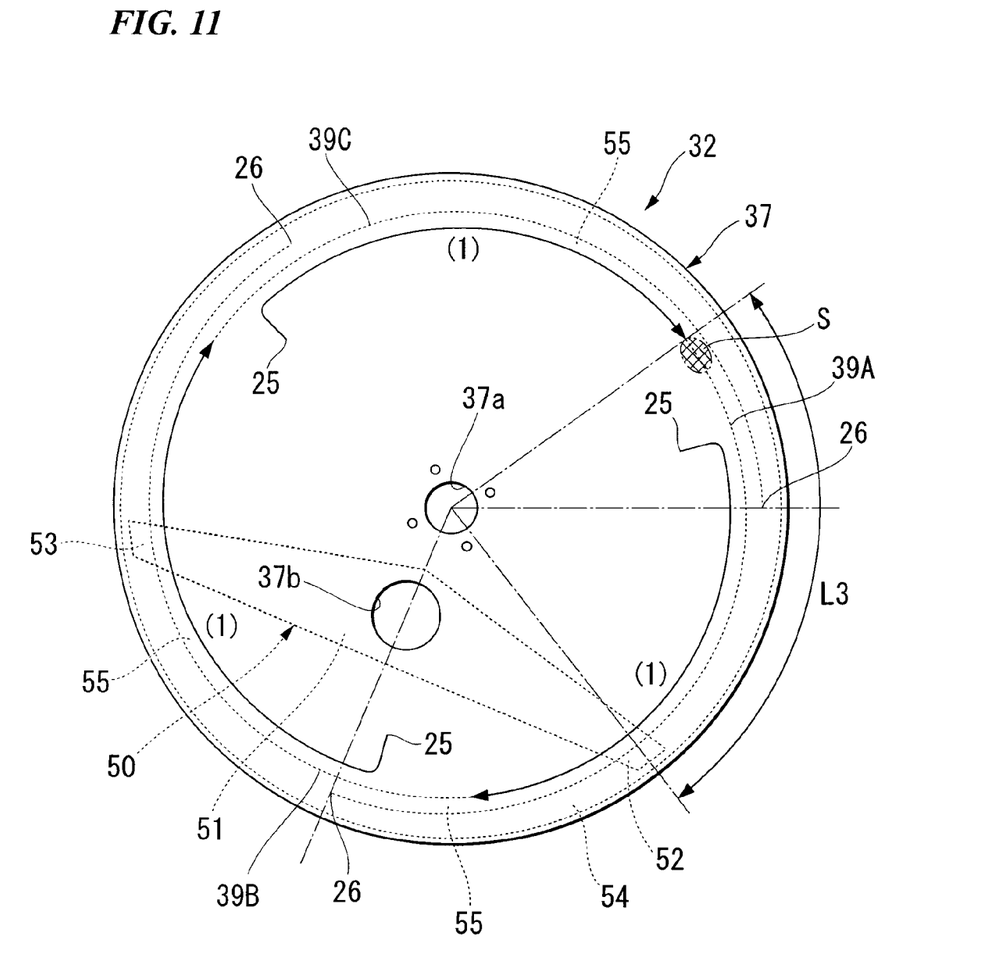
FIG. 11 is a rear view showing an expansion step of the airbag in the airbag apparatus.
Figure 12:
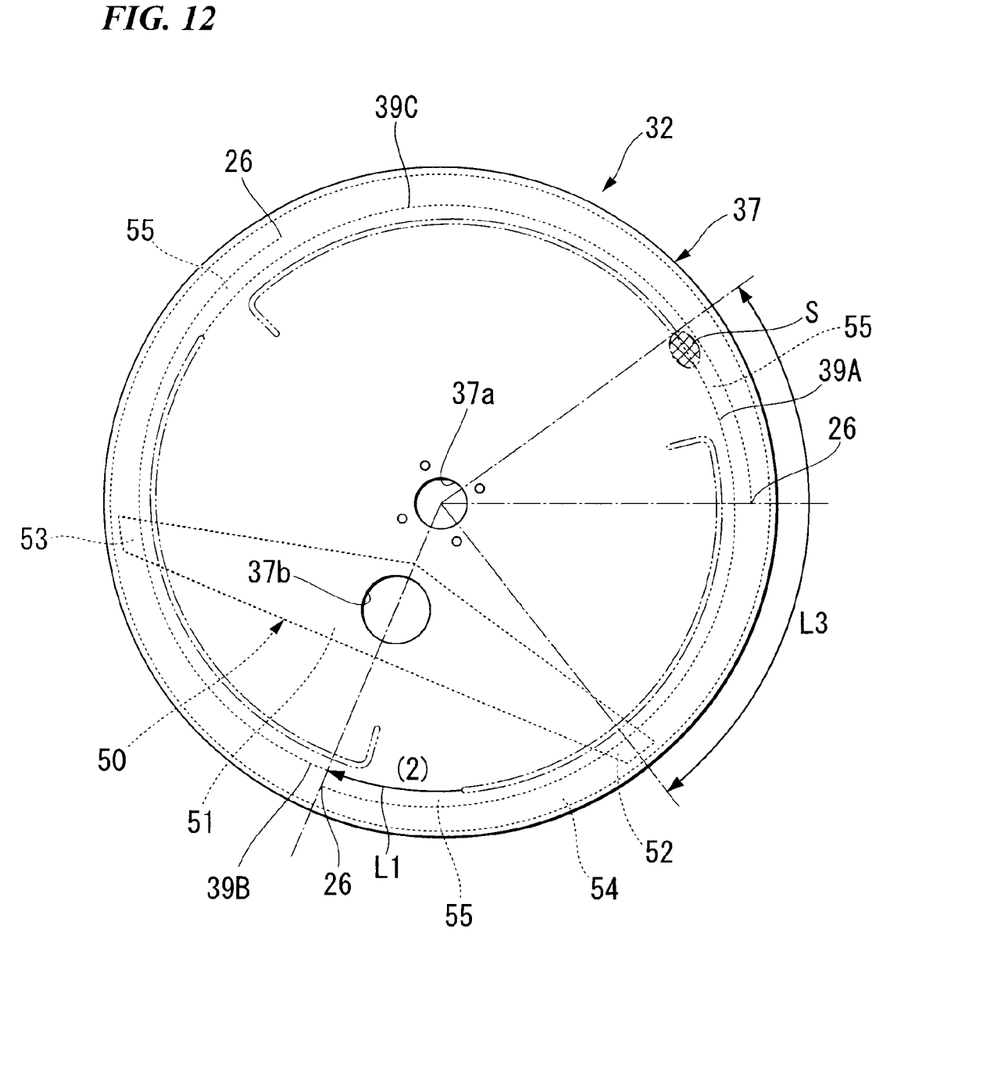
FIG. 12 is a rear view showing an expansion step of the airbag in the airbag apparatus.
Figure 13:
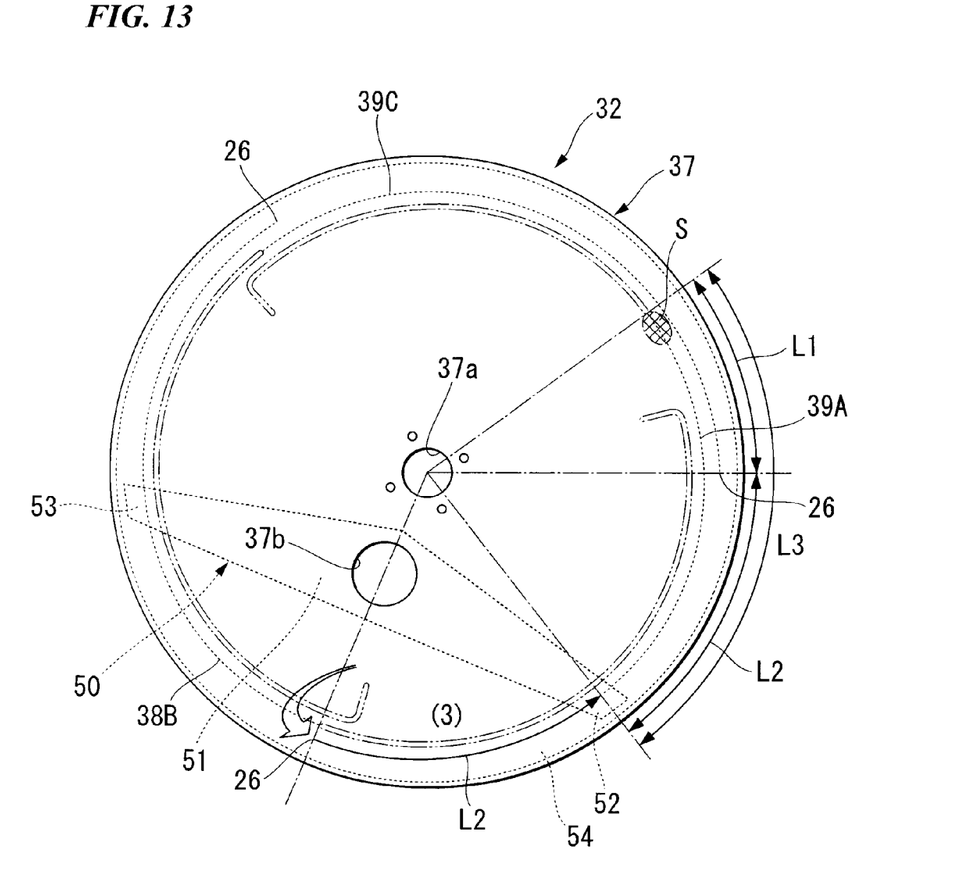
FIG. 13 is a rear view showing an expansion step of the airbag in the airbag apparatus.

Hereinafter, an example situation is explained which involves one rupture joining part 39A. In this example situation, as shown in FIG. 11, the rupture of the rupture joining part 39A is interrupted for some unspecified reason, after the start of the airbag 32 development at a certain position S (see the arrow finishing at position S in FIG. 11). After this interruption, only the remaining two rupture joining parts 39B, 39C continue to rupture. Accordingly, as shown in FIG. 12, the rupture of the rupture joining part 39B, which is adjacent to the rapture joining part 39A, proceeds by a length L1, and the rupture part reaches the vicinity of the finishing-end 26 of the rupture joining part 39A. At this timing, the path 55 width between the rupture joining parts 39A, 39B suddenly widens. As a result, the gas pressure of the outer expansion part 54 in the airbag 32 sharply increases, resulting in an increase of the volume of the outer expansion part 54, as shown in FIG. 13. Thereafter, the outer expansion part 54 starts another rupture of the rupture joining part 39A in the opposite direction from the finishing-end 26 side. In FIGS. 12 and 13, the positions along rupture joining parts 39A, 39B, and 39C, where the rupture is finished, are indicated by broken surrounding lines.

Accordingly, in the case of the airbag apparatus of this example, the attachment of the vent hole cover 50 at the connecting part 52 is stably released by the rupture of the rupture joining part 39A from the side of the finishing-end 26. Although a detailed description is omitted in order to avoid redundancy, even in another example case wherein the rupture of the rupture joining part 39B from the starting-end 25 is interrupted, a similar process releases the attachment of the vent hole cover 50 at the connecting part 53.

Moreover, in the airbag apparatus 13, when the rupture of one of the rupture joining part 39A or 39B from the starting-end 25 side is interrupted at a position S, the time from the interruption to the release of the attachment of the vent hole cover 50 at the connecting part 52 or 53 is substantially the same as the time it takes if the rupture of the rupture joining part 39A or 39B continues without an interruption, from the position S toward the finishing-end direction.

Hereinafter, the above-described situation is explained using the rupture joining part 39A as an example.

In the airbag apparatus 13 the connecting part 52 at both ends of the vent hole cover 50 is provided at a middle position of the finishing-ends 26 of the rupture joining parts 39C and 39A. In the case wherein the rupture of the rupture joining part 39A is interrupted at a position S, as shown in FIG. 12, the length L1 is defined as the length by which the rupture of the adjacent rupture joining part 39B proceeds until the rupture reaches the vicinity of the finishing-end 26 of the rupture joining part 39A. The length by which the rupture continues if the interruption does not occur, from the position S to a position corresponding to the finishing-end 26 of the rupture joining part 39C is equal to the length L1 (see in FIG. 13). Moreover, as shown in FIG. 13, the length L2 is defined as the length by which the rupture of the rupture joining part 39A proceeds, starting from the finishing-end 26, in the opposite direction, until the rupture reaches the connecting part 52 of the vent hole cover 50. The length by which the rupture proceeds along the rupture joining part 39A, from a position next to the finishing-end 26 of the adjacent rupture joining part 39C, to the connecting part 52 of the vent hole cover 50 is equal to the length L2. Accordingly, the length L3, from the position S along the rupture joining, part 39A, to the connecting part 52 of the vent hole cover 50, is equal to the sum of the length L1 and the length L2 (L3=L1+L2). Accordingly, the time it takes from the rupture interruption of the rupture joining part 39A at the position S, until another rupture starting from the finishing-end 26 side releases the attachment of the connecting part 52, is substantially equal to the time it takes if the rupture which reached the position S is not interrupted and proceeds until the rupture releases the attachment of the connecting part 52.

Accordingly, in the airbag apparatus 13, even when the rupture of the rupture joining part 39A is interrupted for some reason, the vent hole 37b can be released at substantially the same timing as the release timing when the rupture interruption does not occur.

Moreover, in the airbag apparatus 13, the periphery parts of the first base fabric piece 36 and the second base fabric piece 37 are stacked and sewn together, to form the peripheral joining part 38. Thereafter, the first base fabric piece 36 and the second base fabric piece 37 are flipped inside-out, to form the airbag 32. On the airbag 32 thus formed, the rupture joining parts 39A, 39B, and 39C are formed so that the finishing-ends 26 thereof are apart from the peripheral joining part 38. Accordingly, the outer expansion part 54 is formed in a ring shape at the periphery part of the airbag 32. In this way, although the production process of the airbag 32 is simple, even when the rupture of the rupture joining parts 39A, 39B from the side of starting-ends 25 is interrupted, a secure rupture is ensured from the finishing-end 26 side.

Figure 14:
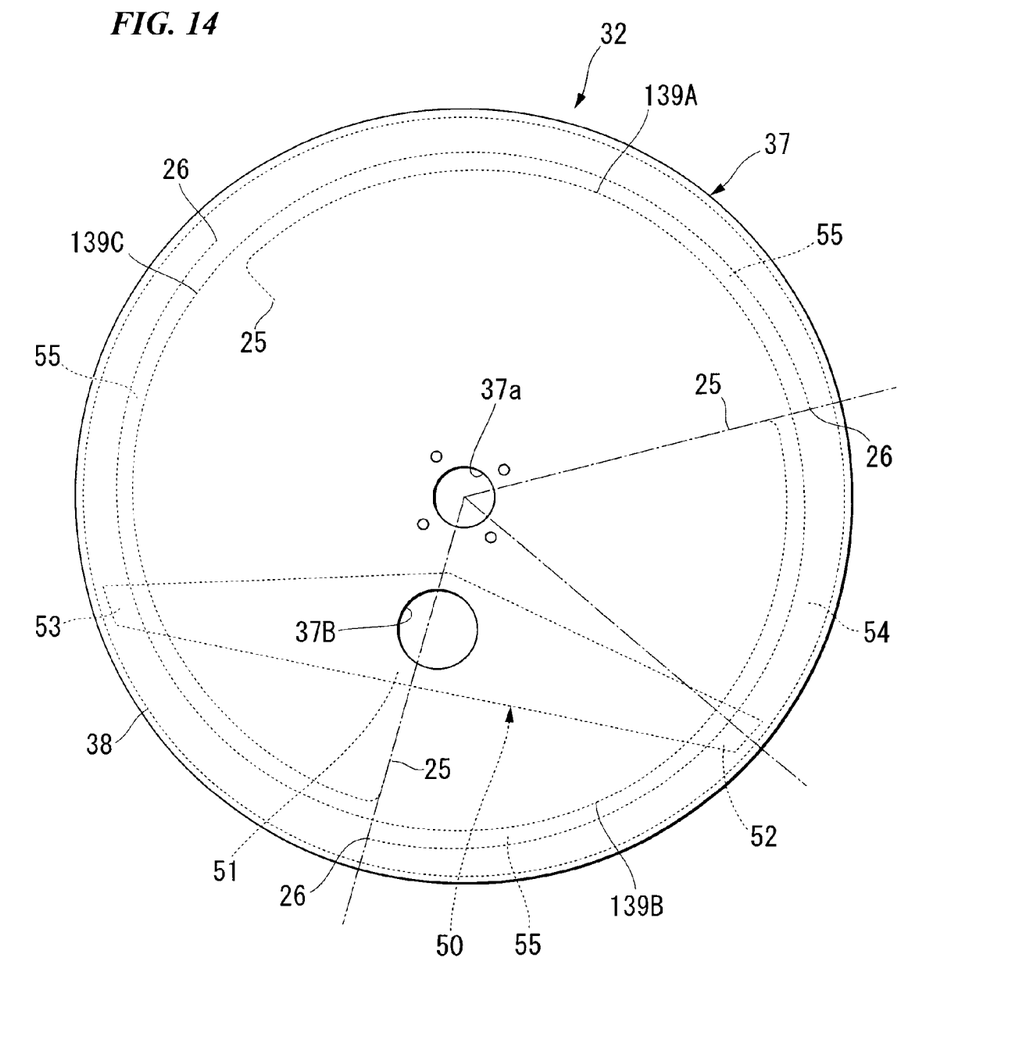
FIG. 14 is a rear view showing an airbag in an airbag apparatus according to another embodiment of the present invention.

FIG. 14 shows another embodiment of the present invention, and corresponds to FIG. 3 of the first embodiment. In FIG. 14, the components corresponding to the first embodiment are denoted by the same reference signs.

The airbag apparatus of this embodiment is substantially the same in its basic constitution as the airbag apparatus of the first embodiment. However, there is a difference in that the position of the starting-end 25 of each of the rupture joining part 139A, 139B, 139C formed on the airbag 32 substantially corresponds to the position of the finishing-end 26 of another one of the rupture joining parts 139A, 139B, 139C, in the circumferential direction. Specifically, the position of the starting-end 25 of the rupture joining part 139A substantially corresponds to the finishing-end 26 of the rupture joining part 139B; the position of the starting-end 25 of the rupture joining part 139B substantially corresponds to the finishing-end 26 of the rupture joining part 139C; the position of the starting-end 25 of the rupture joining part 139C substantially corresponds to the finishing-end 26 of the rupture joining part 139A.

The airbag apparatus has the same constitution as the airbag of the first embodiment, except for the positions of the starting-ends 25 and the finishing-ends 26 of the rupture joining parts 139A, 139B, 139C. Accordingly, substantially the same advantageous effects as the first embodiment can be obtained. On the other hand, each of the rupture joining parts 139A, 139B, 139C has the starting-end 25 positioned at a substantially corresponding position in the circumferential direction as the finishing-end 26 of other one of the rupture joining parts 139A, 139B, 139C. Accordingly, in the production process of the airbag 32, the positioning control of the rupture joining parts 139A, 139B, 139C can be readily performed. Specifically, in the process of consecutively sewing the rupture joining parts 139A, 139B, 139C, the positioning in the circumferential direction can be done simultaneously.

The scope of the present invention is not limited to the above-described embodiments. Various design variations can be made as long as they are included in the scope of the present invention. For example, although in the above-described embodiments, the rupture joining parts 39A, 39B, 39C, 139A, 139B, and 139C are formed by sewing, it is also possible to constitute the rupture joining parts 39A, 39B, 39C, 139A, 139B, and 139C by interweaving or bonding. Moreover, although in the above-described embodiments, the rupture joining parts 39A, 39B, 39C, 139A, 139B, and 139C are formed in a spiral curve shape, any spiral bending shape can be used. Also, it is also possible to constitute the rupture joining parts 39A, 39B, 39C, 139A, 139B, and 139C by combinations of straight lines each formed in an inclined angle to the circumferential direction having the center at the central position of the airbag 32.

Moreover, although in the above-described embodiments, the airbag is stored inside of the steering wheel, the present invention can also be applied to airbag apparatuses which are not stored in the steering wheel.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An airbag apparatus comprising:
   an airbag having at least a pair of base fabric pieces, at least one of which having a center part from which high-pressure gas is introduced into an internal space enclosed by the pair of the base fabric pieces, thereby expanding the airbag;
   a vent hole which discharges internal gas of the airbag;
   a plurality of rupture joining parts each having a starting-end and a finishing-end, the finishing-end provided at an outer position of the airbag than the starting-end, the plurality of rupture joining parts joining the base fabric pieces in a manner breakable by the high-pressure gas expansion; and
   a vent hole cover having a connecting part at which the vent hole cover is connected to the airbag by the rupture joining parts, wherein:
   the airbag has an outer expansion part provided at a position outside the finishing-ends of the rupture joining parts;
   the plurality of rupture joining parts are rotationally symmetric to each other about the center of the base fabric pieces, and partially overlap each other in the circumferential direction; and
   the connecting part of the vent hole cover is provided in the vicinity of a middle position of the two finishing-ends of an adjacent pair of the rupture joining parts.

2. The airbag apparatus according to the claim 1, wherein:
   the plurality of the rupture joining parts include a first rupture joining part and a second rupture joining part; and
   the starting-end of the first rupture joining part is provided in a vicinity of the finishing-end of the second rupture joining part, in a circumferential direction of the airbag.

3. The airbag apparatus according to the claim 1, wherein:
   the pair of the base fabric pieces are joined to each other at a peripheral joining part provided at a periphery part of the base fabric pieces;
   the periphery part of the base fabric pieces protrudes into the internal space enclosed by the pair of the base fabric pieces;
   the finishing-ends of the plurality of the rupture joining parts are provided separated in the radial direction of the base fabric pieces from the peripheral joining part; and
   the outer expansion part is provided between the peripheral joining part and the rupture joining part.

* * * * *